Aug. 25, 1959   A. G. PINCUS   2,901,364
GLASS COMPOSITIONS AND METHOD OF MAKING SAME
Original Filed July 27, 1948
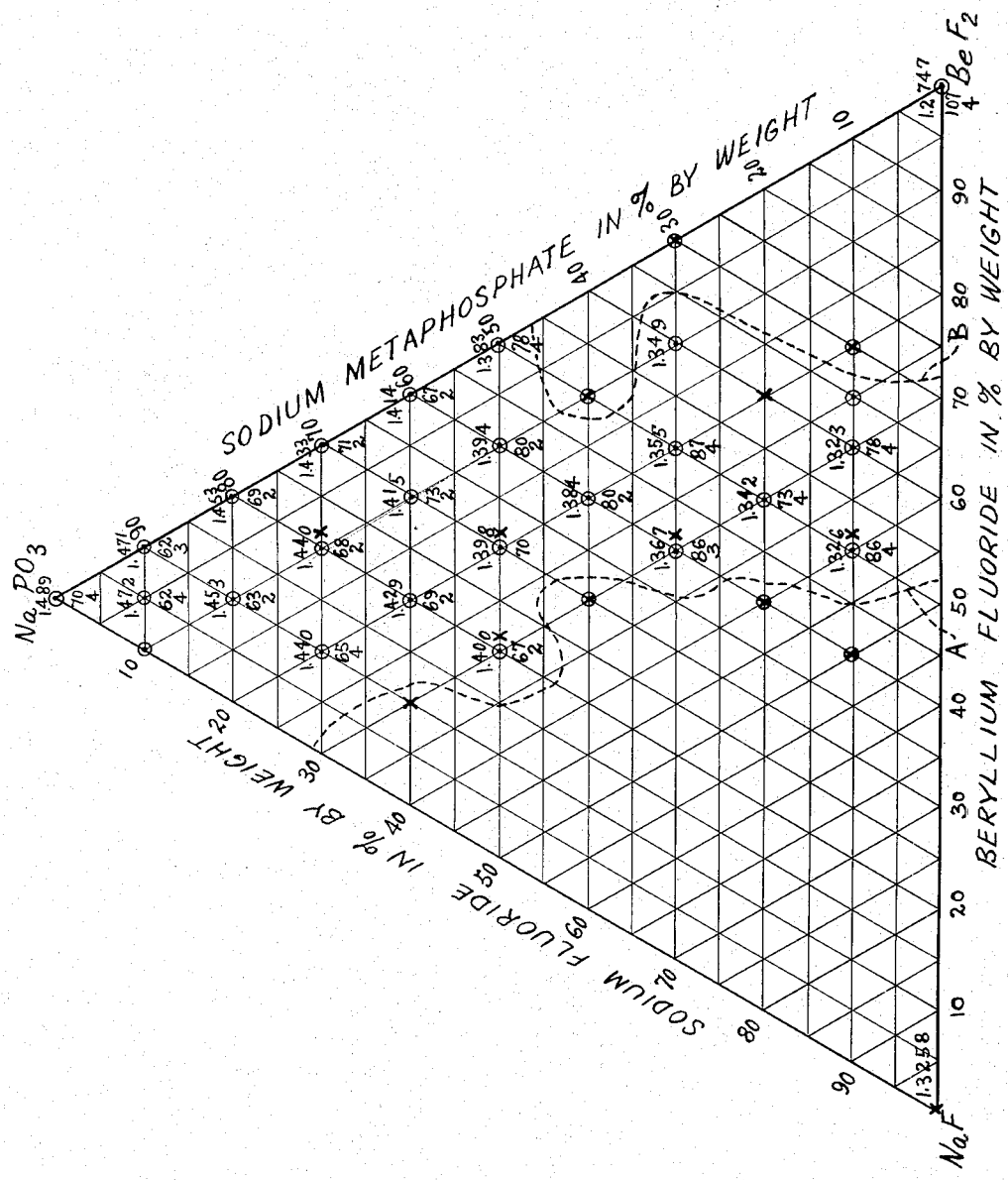
INVENTOR
ALEXIS G PINCUS
BY
Louis L. Gagnon
ATTORNEY.

United States Patent Office 2,901,364
Patented Aug. 25, 1959

2,901,364
GLASS COMPOSITIONS AND METHOD OF MAKING SAME

Alexis G. Pincus, Worcester, Mass., assignor to American Optical Company, Southbridge, Mass., a voluntary association of Massachusetts Original application July 27, 1948, Serial No. 40,963, now Patent No. 2,716,069, dated August 23, 1955. Divided and this application May 18, 1955, Serial No. 509,357

10 Claims. (Cl. 106—47)

This invention relates to glass compositions and has particular reference to glasses which have a low index of refraction and a low or controllable optical dispersion and process of making the same.

This application is a division of applicant's copending application Serial Number 40,963 which was filed July 27, 1948, and which issued August 23, 1955, as Patent Number 2,716,069. Other divisional applications are Serial Number 509,355 and Serial Number 509,356, both filed May 18, 1955.

One of the principal objects of the invention is to provide glasses whose index of refraction is considerably below known commercial glasses, whose index of refraction and reciprocal relative dispersion properties may be varied with respect to each other over a broader range than has heretofore been available, whose chemical durability will be adequate to meet the requirements of particular uses, and which are readily workable and afford ease of fabrication and refabrication.

Another object is to provide glasses of the above nature which may be melted and worked at very low temperatures lying in the region between known commercial glasses and organic plastics and process of making the same.

Another object is to provide glasses of the above nature whose indices of refraction may be more positively controlled and over a wider range than known commercial glasses.

Another object is to provide glasses of the above nature whose dispersive properties may be more positively controlled and over a wider range than known commercial glasses.

Another object is to provide glasses of the above nature which include as essential ingredients fluorine and oxygen in varying ratios as anions combined with selected positive elements as cations in controlled related proportions depending upon the resultant characteristics desired.

Another object is to provide glasses of the above nature which include, as an essential ingredient thereof, beryllium fluoride.

Another object is to provide glasses of the above nature which are formed from blends of metaphosphates with beryllium fluoride and other metal fluorides.

Another object is to provide glasses of the above nature having a wider range of relative proportions on network-forming and non-network-forming cations and a wider range of anions than has hitherto been available.

Another object is to provide glasses of the above nature which may be controlled as to the kinds and relative proportions of anionic constituents present for desired control of dielectric and optical properties.

Another object is to provide glasses of the above character which utilize as fully as possible available and relatively economical raw materials.

Another object is to provide glasses of the above nature possessing characterisics which make possible new fabricating techniques and new applications in coatings, impregnants, cements, enamels, glazes, etc.

Another object is to provide novel processes of obtaining all of the above objects and advantages.

Other objects and advantages of the present invention will become apparent from the following description taken in connection with the accompanying drawing and it will be apparent that many changes may be made in the compositions and processes set forth herein without departing from the spirit of the invention as expressed in the accompanying claims. I, therefore, do not wish to be limited to the exact compositions and processes disclosed as the preferred forms only have been given by way of illustration.

Some glasses possessing the characteristics set forth herein are known in the art but such known prior art glasses did not possess sufficient resistance to weathering and ease of fabrication and refabrication to render them commercially practical. Some suggestions were made of the possibilities in beryllium fluoride glasses from theoretical reasoning by V. M. Goldschmidt, Skrifter Norske Videnskaps-Akad; Oslo (1926), and very limited research was conducted in the field of beryllium fluoride glasses by Dr. George Heyne, Angewandte Chemie, vol. 46, Germany (1933), but neither in any way achieved or taught the broad scope or findings and results obtained by the present invention. Heyne's contribution to the art merely included glasses which he stated were not stable "for practical applications, especially in optics. . . . The beryllium fluoride glasses must, where remaining clear for a long time is required, be protected from moist air or embedded in suitable material." Glasses of the teachings of the present invention do not require this protection and also, in certain compositions taught, are more durable than many glasses which are commonly used in optical applications.

Such known prior art beryllium fluoride glasses embodied compositions utilizing a high proportion of relatively expensive ingredients and failed, in general, to provide the art with any definite knowledge as to control of refractive indices and dispersive properties and at most embodied a very narrow range of compositions as compared with the present invention and offered little, if anything, of commercial interest.

Attempts have also been made to produce lowered refractive index and dispersion by introducing fluorine into an alkali borosilicate base, free from bivalent oxides, resulting in the optical fluor-crowns containing up to about 7% fluorine by weight. These glasses did not provide a refractive index lower than about 1.45. Their dispersion has been tied closely to the index and could not be varied much from $V=67$. Compared to the glasses of the present invention they are difficult to melt, give poor quality yields, and are of inferior chemical durability.

Glasses of the present invention open an entirely new field of research as to optical systems and lens design in general and lend themselves to several different applications. For examples of particular uses: such glasses may replace crystals in highly corrected lens systems; may be used as an intermediate medium for supporting the elements of different lens systems in more positive relation with each other and at the same time replace the conventional air spaces of the elements of such systems with a less abrupt interfacial transition in refractive indices; and will afford other design possibilities which can take advantage of their unique optical characteristics.

The invention is directed particularly to the combining of $BeF_2$ (beryllium fluoride) or equivalent substituents, $(PO_3)^-$ (the metaphosphate radical) or equivalent substituents, and $R^+$ (an ingredient or ingredients of the metallic cations group) in such a manner as to obtain glasses having low or variable and controllable indices of refraction, low or variable and controllable optical dispersions, controlled as to stability and resistance to chemical attack and weathering, controllable characteristics as to melting and softening properties, introducing ease of fabrication and possessing practical working and remelting characteristics.

Another method of describing the possible constituents and their relative proportions is by the generalized formula:

$$A_m B_n (O_x F_{1-x})$$

where A represents the "hole-filling or non-network-forming" cations which may be sodium ($Na^+$), potassium ($K^+$), magnesium ($Mg^{2+}$), calcium ($Ca^{2+}$), barium ($Ba^{2+}$), zinc ($Zn^{2+}$) lithium ($Li^+$), rubidium ($Rb^+$), caesium ($Cs^+$), cadmium ($Cd^{2+}$), lead ($Pb^{2+}$), thallium ($Tl^{1+}$) and ($Tl^{2+}$), strontium ($Sr^{2+}$) or the like;

B represents the network-forming cations of the type beryllium ($Be^{++}$), aluminum ($Al^{3+}$), silicon ($Si^{4+}$), zirconium ($Zr^{4+}$), phosphorus ($P^{5+}$), boron ($B^{3+}$), sulphur ($S^{6+}$), nitrogen ($N^{5+}$), carbon ($C^{4+}$), titanium ($Ti^{4+}$), or the like. It is understood that certain cations, such as aluminum ($Al^{3+}$) are able to function as both hole-fillers and network-formers depending on the chemical balance among the remaining ions;

O represents the oxygen anion, $O^{2-}$;
F represents the fluorine anion, $F^-$.

In this generalized formula the sum of the anions present is always taken as unity and the relative proportions of cations present refer to the unit anion. Thus, if fluorine is the only anion it will be given the subscript unity. Where both fluorine and oxygen are present, the fluorine will differ from unity by the proportion $x$ of oxygen present and the fluorine will have the subscription $1-x$ resulting from subtracting the number represented by $x$ from unity. If other anions such as chlorine, bromine or sulphur are introduced, they will be included in the total within the parenthesis, but the sum of the anions will still be reduced to unity.

The subscripts $m$ and $n$, respectively, indicate the relative numbers of ions of type A and type B per unit anion.

EXAMPLES

I. Beryllium fluoride ($BeF_2$) glass would be expressed as $Be_{0.5}F$.

II. A useful glass composition has been found to be made from the batch:

| | Percent by weight |
|---|---|
| Beryllium fluoride | 40 |
| Cryolite | 40 |
| Sodium metaphosphate | 20 | it being understood that in this formula or wherever referred to herein, the metaphosphate of sodium can be replaced partially or entirely by other known glass forming metaphosphates such as aluminium, potassium, zinc, calcium, beryllium or the like.

Its formula would be expressed as:

$$Na_{0.22}(Be_{0.25}Al_{0.06}P_{0.06})_{0.37}(O_{0.17}F_{0.83})$$

III. Practical substitutions include:

The preceding values may be derived as follows:

Since the chemical formula for cryolite is $Na_3AlF_6$, the formula for sodium metaphosphate is $NaPO_3$ and the formula for beryllium fluoride is $BeF_2$ and the atomic weights for the elements contained therein Na=22.99, Al=26.97, F=19.00, O=16.00, P=30.98, and Be=9.02, it can readily be ascertained that the molecular weight of cryolite is equal to 209.96, the molecular weight of sodium metaphosphate is equal to 101.98 and the molecular weight of beryllium fluoride is equal to 47.02.

It follows, therefore, that since cryolite constitutes 40% by weight of the above batch, the actual weight of the sodium contributed by the cryolite will be equal to 3×22.99×40/209.99, or 13.14%; the actual weight of the aluminum in the batch will be equal to 26.97×40/209.96 or 5.14%; and the actual weight of the fluorine contributed by the cryolite will be equal to

6×19.00×40/209.96 or 21.72%. Therefore, the Na contributed by the cryolite is equal to 13.14/22.99 or 0.571 mole.

Since the sodium metaphosphate constitutes 20% by weight of the batch, the actual weight of the sodium contributed thereby will be equal to 22.99×20/101.98 or 4.51%. Thus, the Na in the batch due to the sodium metaphosphate will be equal to 4.51/22.99 or 0.196 mole. The total Na in the batch due to both the cryolite and the sodium metaphosphate will be 17.65% and, accordingly, will be equal to 0.571+0.196 or 0.77 mole.

In like manner, values for the other elements in the batch may be calculated. The aluminum in the batch, as pointed out above, has an actual weight of 5.14% and when this figure is divided by 26.97, it will give 0.19 mole.

The actual weight of fluorine in the cryolite equals 27.72%, as given above, and the actual weight of the fluorine in the beryllium fluoride equals 2×19×40/47.02, or 32.33%. The total fluorine in the batch due to the cryolite and the beryllium fluoride is, therefore, 54.05% and when divided by the atomic weight of fluorine gives 2.84 moles.

The actual weight of the beryllium in the batch is equal to 9.02/47.02×40, or 7.67% and when divided by 9.02 gives 0.85 mole.

The phosphorus in the batch is equal to 30.98/101.98×20 or 6.08%; and when this figure is divided by 30.98, it gives 0.20 mole. Likewise, the oxygen is equal to

3×16.00×20/101.98 or 9.41%; and when divided by 16.00 gives 0.59 mole.

Applying this information to the general formula $A_m B_n (O_x F_{1-x})$, it will appear as follows:

$$Na_{0.77}(Be_{0.85}Al_{0.19}P_{0.20})O_{0.59}F_{2.84}$$

with the last two values adding up to 3.43. Considering the O+F sum as unity, the other values of the formula may be related to unity by dividing each by 3.43. This will give $$Na_{.22}(Be_{0.25}Al_{0.06}P_{0.06})_{0.37}O_{0.17}F_{0.83}$$

For Na—Li, K, Rb, Cs completely; Ba, Sr, Ca, Mg, Zn, Cd, Pb, Bi, Tl, etc. partially.

For Be—the minimum is determined by the proportion of fluorine present and Be can be partially replaced by Al, B, Si, Ti, Zr, C, N, P, S, etc.

Such a glass and its variations are described more in detail and specifically claimed in previously mentioned parent application Serial Number 40,963.

By the use of aluminum silicofluoride certain composition regions have been discovered in which the Be can be completely replaced and still obtain glasses having similar characteristics to those set forth above.

This is described more in detail and specifically claimed in previously mentioned copending species application Serial Number 509,355.

The phosphorus cation $P^{5+}$ has been found to be a particularly useful member of the B group because it brings about a compatibility between oxygen and fluorine anions which greatly promotes glass-forming tendencies and inhibits crystallization or devitrification.

Also within the B group it has been found possible to replace some of the phosphorus cations ($P^{5+}$) with nitrogen ($N^{5+}$) and carbon ($C^{4+}$), with marked improvement in chemical durability of the glasses and unusual optical properties resulting.

By this form of representation the invention is directed particularly to the combining of "B" network-forming cations with sufficient "A" non-network forming cations to assure homogeneous vitreous characteristics and with balanced proportions of fluorine and oxygen (and other anions such as mentioned above) in such a manner as to obtain true homogeneous glasses having low or variable and controllable indices of refraction, low or variable and controllable optical dispersions, controlled as to stability and resistance to chemical attack and weathering, controllable characteristics as to melting and softening properties, introducing ease of manufacture and possessing practical working and remelting characteristics.

Referring to the drawing, the figure is a triaxial diagram illustrating glass formation in the field NaF, $BeF_2$ and $NaPO_3$ and giving the refractive index and nu (V) value of the resulting glasses.

A marking code has been used to indicate the melting characteristics of the batches given. This marking code is as follows:

⊙ (Dot within a circle) indicates that a clear glass can be obtained without special precautions or deviations from a normal melting, pouring and cooling cycle.

Ox (a cross beside the circle) indicates that scattered crystals were obtained within the clear glass. As is well known these may often be avoided by minor changes in the melting procedures but would introduce more positive control and more difficult procedure.

⊗ (Cross within a circle) indicates that the specimen was still vitreous in nature but contained enough crystals to cause an opalescent, opal or alabaster appearance. As is well known this difficulty could be avoided and clear glass could be obtained by extreme quenching but again would introduce even greater difficulty in fabrication. The ⊙ therefore indicates the most desirable batches which may be formed with the usual ease of fabrication desired.

x (Cross alone) indicates that the composition was non-vitreous in its behavior during heating, or cooled to an opaque, fragile mass, predominantly crystalline and free from glass and is very undesirable.

The figures above the ⊙ indicate the index of refraction of that particular batch and the figures immediately below the ⊙ indicates the nu value (V) and the number immediately below that indicates an arbitrary rating for chemical durability.

In the disclosure set forth above the characteristics listed have been assessed by:

Refractive index and dispersion (nu value) by measurements with an Abbe refractometer on polished faces. The specimens were annealed to remove most of the mechanical strain, but were not "fine-annealed" or "compacted" to maximum and uniform index. It is well known that refractive index values shift with the refinement of annealing approaching maximum value with prolonged annealing at the proper cooling rate. Dispersion values would similarly be sensitive to heat treatment. The values given herein, however, are indicative of the order of magnitude of the actual values and are of the type usually relied upon in determining such values to a first approximation.

Chemical durability was rated by appearance of the specimens immediately after polishing and then again after a few months' storage in paper envelopes in the laboratory atmosphere.

On the triaxial diagram given:

4 indicates a hygroscopic glass, similar to beryllium fluoride
3 indicates that the surface formed a white film,
2 indicates that the surface stained,
1 indicates that the surface and the specimen retained its polish and brightness comparable to commercial optical glasses and the glass is considered to possess good durability.

Melting and working procedures and their evaluation will be discussed more in detail later in the specification.

Referring more particularly to the diagram constituting the figure it is particularly pointed out that the glasses referred to therein comprise selected proportions of sodium fluoride, sodium metaphosphate and beryllium fluoride. The various glasses resulting from the combining of the above three ingredients were measured for index of refraction, nu value and durability and the values obtaind are noted on the diagram.

Pure beryllium fluoride ($BeF_2$) glass has been found to possess extraordinarily low refractive index and optical dispersion. These properties have been found to be as follows:

$$N_D = 1.27475$$
$$N_F = 1.27649$$
$$N_C = 1.27392$$
$$V = \frac{N_D - 1}{N_F - N_C} = 107$$
$$R = \frac{N_D - N_C}{N_F - N_C} = 0.322$$

Unfortunately for its usefulness in optical systems this glass is extremely hydroscopic and it is the essence of this invention to teach the obtaining of glasses of the above nature, namely glasses having low refractive index and optical dispersion, with improved chemical durability.

As set forth other compounds have been combined with beryllium fluoride in controlled proportions whereby a homogeneous melt may be obtained and which can be cooled to room temperature and reworked without loss of homogeneity.

Also, as shown in the figure, although the index of refraction increases with the addition of sodium fluoride and sodium metaphosphate to the beryllium fluoride, several different indices of refraction and nu values may be obtained by shifting the related proportions of the ingredients while increasing the durability of the glass.

By referring to the code set forth above, different characteristics of the melts listed in said figure can be easily determined. It is to be understood that the melts set forth therein are only indicative of the varying characteristics which might be obtained and that by interpolation between specific batches set forth, an infinite variety of intermediate batch compositions can be derived with intermediate optical properties. It is believed that the various melts charted are readily determinable and that it is unnecessary to furnish any further disclosure of the related proportions of ingredients of said different melts.

The dash line A indicates the boundary of the field of useful glass compositions as to the sodium fluoride content and the dash line B indicates the boundary as to the upper limits of beryllium fluoride keeping in mind glass forming characteristics. From the chart, it is particularly pointed out that there is no upper limit to the sodium meatphosphate content for glass forming characteristics but when the sodium metaphosphate content is above 80% the resultant glasses tend to be hygroscopic.

Although some of the glasses within the charted area are hygroscopic in nature and less durable than others set forth herein, they, however, may meet the requirements of particular uses, such as for optical elements which may be protected by imbedding them in a resin or by sealing them within a lens system, for use as cements, or other uses. Several interesting findings cen be derived from study of the observations summarized in the figure as follows:

(a) Chemical durability improves as NaF replaces $BeF_2$ and even more as $NaPO_3$ increases. There is an optimum in durability between 40 and 80% of $NaPO_3$.

(b) Refractive index increases slowly as NaF replaces $BeF_2$ though at a progressively slower rate as $NaPO_3$ increases to about 70%. The most important factor in establishing refractive index level is $NaPO_3$ content. This can be shown to be a function of the ratio of fluorine to oxygen in the atomic formula method of expressing composition.

(c) Nu values in general are higher as the $BeF_2$ content is increased and the $NaPO_3$ content is decreased and vice versa, but there are exceptions as evidenced by the chart. A maximum dispersion appears to exist around 30% $NaPO_3$ and a minimum around 80 to 90% $NaPO_3$.

(d) Meltability is controlled by the proper balance of beryllium fluoride for each sodium metaphosphate level.

From the above triaxial diagram the percentage by weight of the various ingredients from which homogeneous glassy structures result are given as follows:

Example A

| | Range of percentages by weight |
|---|---|
| Beryllium fluoride ($BeF_2$) | Approximately 0 to 65%. |
| Sodium fluoride (NaF) | Approximately 0 to 40%. |
| Sodium metaphosphate ($NaPO_3$) | Approximately 10 to less than 100%. |

The above gives the widest possible range.

A more practical range of the glasses illustrated in the drawing from the standpoint of chemical durability ratings of 1 or 2 is as follows:

Example B

| | Range of percentages by weight |
|---|---|
| Beryllium fluoride ($BeF_2$) | Approximately 10 to 40%. |
| Sodium fluoride (NaF) | Approximately 0 to 25%. |
| Sodium metaphosphate ($NaPO_3$) | Approximately 40 to 80%. |

Some desirable specific batches are as follows:

Example C

| | Approximate Percentages by Weight | | |
|---|---|---|---|
| | Batch 1 | Batch 2 | Batch 3 |
| Beryllium Fluoride ($BeF_2$) | 30 | 40 | 10 |
| Sodium Fluoride (NaF) | 0 | 10 | 10 |
| Sodium Metaphosphate ($NaPO_3$) | 70 | 50 | 80 |
| Refractive Index ($N_D$) | 1.433 | 1.394 | 1.453 |
| Nu | 71 | 80 | 63 |
| Durability Rating | 2 | 2 | 2 |

Increasing the aluminum content at the expense of the sodium content by introducing the metaphosphate radical by means of aluminum metaphosphate rather than sodium metaphosphate is desirable in some instances in order to improve chemical durability and lower divitrification. It has been found that when a minimum sodium content is maintained in the formula according to principles taught herein aluminum metaphosphate can completely replace sodium metaphosphate.

A wide range of desirable compositions has been found in the composition field described by a tetrahedron with sodium fluoride, beryllium fluoride, sodium metaphosphate, and aluminum metaphosphate at the four apices. Sections taken through this tetrahedron at 10 percent steps in $BeF_2$ have shown that glasses form throughout most of the triangular sections from 60% to 10% $BeF_2$. At 60% and 50% $BeF_2$ almost all the glasses were hygroscopic. One exception was at 50% $BeF_2$+20% $NaPO_3$+30% $Al(PO_3)_3$ which had a durability rating of 2, $N_D$=1.378 and nu=87. At 40% $BeF_2$ most glasses had durability ratings of 2, at 30% a few rated 1 and by 20% $BeF_2$ a large area of glass formation rated 1.

Selected examples from the numerous glasses prepared within the field are as follows:

Example D

| | Approximate Percentages by Weight | | | | |
|---|---|---|---|---|---|
| | Batch 1 | Batch 2 | Batch 3 | Batch 4 | Batch 5 |
| Beryllium Fluoride ($BeF_2$) | 40 | 30 | 20 | 10 | 30 |
| Sodium Fluoride (NaF) | 20 | 10 | 20 | | 20 |
| Sodium Metaphosphate ($NaPO_3$) | 20 | 40 | 30 | 40 | |
| Aluminum Metaphosphate ($Al(PO_3)_3$) | 20 | 10 | 30 | 50 | 50 |
| Refractive Index ($N_D$) | 1.389 | 1.434 | 1.440 | 1.511 | 1.428 |
| Nu | 81 | 71 | 68 | 71 | 72 |
| Durability Rating | 2 | 1 | 1 | 1 | 1 |

Briefly, again it can be seen that compositions of this type afford the advantage of being able to vary refractive index and nu value independently.

Using any one of these specific compositons as a starting point, a further wide variety of substitutions is possible to modify the optical properties of the resulting glass, to improve the melting and working characteristics, or to employ cheaper and more desirable ingredients.

For example, it is desirable to keep the beryllium fluoride content at a minimum because of its high price, difficulty in handling, and volatility. In the batches set forth in Example D above having a beryllium fluoride content of approximately 40%, it has been found possible to partially substitute aluminum silicofluoride for the beryllium fluoride. It has also been found possible to partially or completely replace sodium metaphosphate by aluminum metaphosphate or other metaphosphates. This is illustrated in Example E:

Example E

| | Approximate Percent by Weight | | |
|---|---|---|---|
| | Batch 1 | Batch 2 | Batch 3 |
| Beryllium Fluoride ($BeF_2$) | 40 | 50 | 50 |
| Aluminum Silicofluoride ($Al_2(SiF_6)_3$) | 40 | 30 | 30 |
| Sodium Metaphosphate ($NaPO_3$) | 10 | | |
| Aluminum Metaphosphate ($Al(PO_3)_3$) | 10 | | |
| Magnesium Metaphosphate ($Mg(PO_3)_2$) | | 20 | |
| Beryllium Metaphosphate ($Be(PO_3)_2$) | | | 20 |
| Refractive Index ($N_D$) | 1.368 | 1.358 | 1.349 |
| Nu | 74 | 71 | 74 |
| Durability Rating | 1 | 1 | 4 |

A particularly interesting type of substitution is that in which the sodium metaphosphate is replaced not only by other metaphosphates but by salts supplying other radicals in place of the metaphosphate radical, for example, carbonate $(CO_3)^{2-}$, nitrate $(NO_3)^{1-}$, sulphate $(SO_4)^{2-}$ and the like. In certain cases, it has even been found possible to introduce the hydroxyl anion $(OH)^-$. In all of these cases, sodium has been used as the cation constituents of the salt but has been found to be replaceable by calcium, potassium, zinc and the other A group elements.

In the case of all of the specific examples set forth above, it is possible to restate the composition in terms of the generalized formula: $A_mB_n(O_xF_{1-x})$. For illustrational purposes, glasses which have been referred to above may be represented as follows:

Example F

| Examples | Atomic Proportions | $N_D$ |
|---|---|---|
| C—Batch 1 | $Na_{0.20}(Be_{0.19}P_{0.20})_{0.39}(O_{0.61}F_{0.39})$ | 1.43 |
| C—Batch 2 | $Na_{0.31}(Be_{0.25}P_{0.15})_{0.40}(O_{0.49}F_{0.57})$ | 1.39 |
| D—Batch 5 | $Na_{0.14}(Be_{0.19}Al_{0.06}P_{0.16})_{0.41}(O_{0.49}F_{0.51})$ | 1.43 |
| E—Batch 2 | $Mg_{0.03}(Be_{0.27}Al_{0.03}Si_{0.05}P_{0.06})_{0.41}(O_{0.17}F_{0.83})$ | 1.36 |

From the above specific formulas, it is possible to derive some generalizations about the relative amounts of the cations which can be introduced and still obtain glasses, and also the range within which the amounts of A cations can be varied relative to the B cations and to (O+F); also, the extent to which other elements can be introduced for the beryllium and phosphorus in the B group. It also becomes clear that it is the relative proportion of fluorine to oxygen which controls the refractive index level. The higher the fluorine fraction, the lower the refractive index.

It is to be noted that the fraction of sodium (Na) varies over a wide range and in certain cases may be omitted entirely. Sodium is quoted in nearly all the examples but glasses have been prepared where the sodium has been replaced by any of the A group enumerated above. Example E illustrates an instance where magnesium (Mg) completely replaces sodium. Among the B group cations it is to be noted that aluminum (Al), phosphorus (P), silicon (Si) and carbon (C) replace beryllium in relatively small fractions but it has been found that even these minor substitutions play an important role in improving the chemical durability and meltability. In arriving at these substitutions it has been found helpful to evaluate the possibilities from the standpoint of the "ionic potentials" of the element concerned and the cation derived from it. The ionic potential is established by dividing the valence of a cation by its ionic radius. It can be seen that the smaller the radius and the larger the valence the higher is the ionic potential, and high ionic potential has been found to favor a strong structure with good chemical durability, increased hardness and other desirable properties.

Glasses of this unusual type require the use of some relatively novel raw materials for glass making. Beryllium fluoride is available in the form of lumps of high purity beryllium fluoride glass from manufacturers of beryllium chemicals. It has also been obtained in a less pure powdered form. Other fluoride such as those of sodium, potassium, magnesium, and calcium are generally available. There are some advantages in using the alkali acid fluorides such as $KHF_2$ because they are less hygroscopic than the normal fluorides and offer a more favorable fluorine to alkali ratio.

As source of a carbon we have found the carbonates advantageous; for example, sodium carbonate ($Na_2CO_3$) and calcium carbonate ($CaCO_3$). The metaphosphates are also commercially available.

The choice of a refractory to hold this type of melt depends on how high the fluorine content is compared to the phosphate. At the highest fluorine contents platinum seemed most desirable and was not attacked directly by the melts, but it was found that care had to be taken not to let metallic iron or other metals from alloys come in contact with platinum and the melt as the metal was fluxed by the fluoride-phosphate and in turn attacked the platinum. Fused silica crucibles, graphite and carbon are also practical.

In the high phosphate range ordinary ceramic crucibles (aluminum silicates) have been found to be satisfactory, and in some cases even preferable to platinum.

The choice of melting cycle is also determined by the relative amounts of fluorine and oxygen, that is of fluorides and metaphosphates. Most of these compositions, however, could be melted between 1600 and 1900° F. The higher fluorine glasses fumed considerably during this melting stage particularly if the raw materials are damp or contain water of constitution; therefore, the time at this upper melting temperature should be kept as short as possible and for experimental melts of 50 to 250 grams about 5 minutes was ordinarily adequate for complete melting. The lower fluorine glasses are less critical and may be held for longer periods in the melting range. The furnace temperature should then be lowered as rapidly as possible to about 1200° F., depending upon the viscosity and the devitrification tendency of the particular formula, and the melt held at that temperature for about a half an hour or long enough to permit it to calm down and get rid of its fuming and bubbles. Certain of the compositions could be held at temperatures as low as 850° F. without devitrifying and still poured fluidly. Because of the fuming and the extremely fluid nature of these glasses they tend to be quite striated and it is necessary to stir them at the lower temperature. The melts can be poured into graphite or graphitized iron moulds and then annealed. Because of the wide range of compositions taught no specific annealing temperature can be mentioned although 450° F. has been found satisfactory for most of the more desirable formulas. After annealing to release strain and cooling slowly at room temperature, glasses are obtained which can be ground and polished and otherwise handled like conventional glasses. They possess the extraordinary property of being workable at extremely low temperatures, intermediate between the working temperature of normal glasses and organic plastics. The glasses with higher fluorine ratios (fluorine content of 0.50 or higher) have been worked by pressing at temperatures as low as 600° F. Glasses with a durability rating of 3 or 4 can be polished by conventional means but it has been found helpful to use a solution of ethylene glycol and water as the liquid suspending the rouge.

These glasses exhibit other unusual properties such as extremely high thermal expansion, low softening temperatures and unusual transmissions in the ultra-violet and infra-red regions.

Therefore, from the above teachings, various types of homogeneous structures and specific glass-forming compositions can be produced which permit control of the melting and working properties, control over the chemical durability and control over the optical properties both as to the refractive index level and the relationship between refractive index and dispersion.

This has been accomplished as stated by combining controlled amounts of fluorine and oxygen in varying ratios as anions and selected positive elements as cations in controlled related proportions depending upon the resultant characteristics desired.

The batch formulas, final analysis, percentages, etc. given above are by way of illustration only and should not be limitive of the invention except in so far as they are specifically recited in the appending claims.

From the foregoing, it will be seen that I have produced means and method of a simple and efficient nature that will produce all of the objects and advantages of the present invention.

Having described my invention, I claim:

1. A homogeneous structure consisting essentially of the fused product of approximately 40% by weight of beryllium fluoride ($BeF_2$), approximately 10% by weight of sodium fluoride (NaF), and approximately 50% by weight of sodium metaphosphate ($NaPO_3$), said structure having a refractive index of approximately 1.394 and a nu value of approximately 80.

2. A homogeneous structure consisting essentially of the fused product of approximately 10% by weight of beryllium fluoride ($BeF_2$), approximately 10% by weight of sodium fluoride (NaF), and approximately 80% by weight of sodium metaphosphate ($NaPO_3$), said structure having a refractive index of approximately 1.453, and a nu value of approximately 63.

3. A homogeneous structure consisting essentially of the fused product of approximately 40% by weight of a beryllium fluoride ($BeF_2$), approximately 20% by weight of sodium fluoride (NaF), approximately 20% by weight of sodium metaphosphate ($NaPO_3$), and approximately 20% by weight of aluminum metaphosphate ($Al(PO_3)_3$), said structure having a refractive index of approximately 1.389, and a nu value of approximately 81.

4. A homogeneous structure consisting essentially of the fused product of approximately 40% by weight of beryllium fluoride ($BeF_2$), approximately 10% by weight of sodium fluoride (NaF), approximately 40% by weight of sodium metaphosphate ($NaPO_3$), and approximately 10% by weight of aluminum metaphosphate $(Al(PO_3)_3)$, said structure having a refractive index of approximately 1.434, and a nu value of approximately 71.

5. A homogeneous structure consisting essentially of the fused product of approximately 20% by weight of beryllium fluoride $(BeF_2)$, approximately 20% by weight of sodium fluoride (NaF), approximately 30% by weight of sodium metaphosphate $(NaPO_3)$, and approximately 30% by weight of aluminum metaphosphate $(Al(PO_3)_3)$, said structure having a refractive index of approximately 1.440, and a nu value of approximately 68.

6. A homogeneous structure consisting essentially of the fused product of approximately 30% by weight of berylium fluoride $(BeF_2)$, approximately 20% by weight of sodium fluoride (NaF), and approximately 50% by weight of aluminum metaphosphate $(Al(PO_3)_3)$, said structure having a refractive index of approximately 1.428, and a nu value of approximately 72.

7. A homogeneous durable glassy structure consisting essentially of the fused product of approximately 10 to 40% by weight of beryllium fluoride $(BeF_2)$, approximately 5 to 25% by weight of sodium fluoride (NaF) and approximately 35 to 85% by weight of a sodium metaphosphate $(NaPO_3)$.

8. A fused homogeneous structure consisting essentially of the sodium, beryllium, phosphorous, oxygen and fluorine atoms resulting from a batch consisting essentially of beryllium fluoride $(BeF_2)$ from approximately 10 to 40% by weight, of sodium fluoride (NaF) from approximately 5 to 25% by weight and of sodium metaphosphate $(NaPO_3)$ from approximately 35 to 85% by weight.

9. A homogeneous durable glassy structure consisting essentially of the fused product of approximately 20 to 40% by weight of beryllium fluoride $(BeF_2)$, approximately 10 to 20% by weight of sodium fluoride (NaF), approximately 20 to 40% by weight of sodium metaphosphate $(NaPO_3)$ and approximately 10 to 30% by weight of $(Al(PO_3)_3)$, said structure having a relatively low refractive index between approximately 1.389 to 1.440 and a dispersion factor between 68 and 81.

10. A homogeneous durable clear transparent fused optical glass consisting essentially of approximately 10 to 40% by weight of beryllium fluoride $(BeF_2)$, approximately 5 to 25% by weight of sodium fluoride (NaF) and approximately 35 to 85% by weight of a metaphosphate selected from the group consisting of sodium metaphosphate, potassium metaphosphate, aluminum metaphosphate, beryllium metaphosphate and magnesium metaphosphate and mixtures thereof, said fused glass having a relatively low refractive index ranging between approximately 1.384 and 1.453 and a dispersion factor ranging between 63 and 81.

References Cited in the file of this patent

UNITED STATES PATENTS 2,716,069     Pincus _____ Aug. 23, 1955